United States Patent
Jung et al.

(10) Patent No.: US 8,743,832 B2
(45) Date of Patent: Jun. 3, 2014

(54) METHOD FOR PERFORMING UNCONTROLLED HANDOVER

(75) Inventors: In Uk Jung, Anyang-Si (KR); Gene Beck Hahn, Anyang-Si (KR); Yong Ho Kim, Anyang-Si (KR); Ki Seon Ryu, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 13/561,898

(22) Filed: Jul. 30, 2012

(65) Prior Publication Data

US 2012/0294285 A1 Nov. 22, 2012

Related U.S. Application Data

(63) Continuation of application No. 12/627,450, filed on Nov. 30, 2009, now Pat. No. 8,259,678.

(60) Provisional application No. 61/169,287, filed on Apr. 14, 2009.

(30) Foreign Application Priority Data

Jul. 28, 2009 (KR) .................. 10-2009-0068851

(51) Int. Cl.
 *H04W 4/00* (2009.01)
 *H04W 80/04* (2009.01)
(52) U.S. Cl.
 CPC .................................. *H04W 80/04* (2013.01)
 USPC ............................. 370/331; 370/389; 455/436
(58) Field of Classification Search
 CPC .............................. H04W 36/00; H04W 80/00
 USPC .................... 370/331, 389; 455/436
 See application file for complete search history.

(56) References Cited

U.S. PATENT DOCUMENTS

| 7,613,148 | B2 | 11/2009 | Hong et al. |
| 2005/0101328 | A1* | 5/2005 | Son et al. ................. 455/436 |
| 2007/0149198 | A1 | 6/2007 | Park et al. |
| 2007/0201697 | A1 | 8/2007 | Altshuller et al. |
| 2007/0218896 | A1* | 9/2007 | Altshuller et al. ......... 455/432.1 |
| 2007/0249347 | A1 | 10/2007 | Saifullah et al. |
| 2009/0040983 | A1 | 2/2009 | Kim et al. |
| 2009/0074189 | A1 | 3/2009 | Ryu et al. |
| 2009/0176494 | A1* | 7/2009 | Lee et al. ................. 455/436 |
| 2009/0190555 | A1* | 7/2009 | Oguchi ..................... 370/331 |
| 2010/0008327 | A1 | 1/2010 | Son et al. |
| 2010/0020765 | A1 | 1/2010 | Cheng et al. |
| 2010/0061339 | A1 | 3/2010 | Kim et al. |

(Continued)

FOREIGN PATENT DOCUMENTS

| CN | 101292558 A | 10/2008 |
| JP | 2009-182549 A | 8/2009 |

(Continued)

*Primary Examiner* — Andrew Lai
*Assistant Examiner* — Sumitra Ganguly
(74) *Attorney, Agent, or Firm* — Birch, Stewart, Kolasch & Birch, LLP

(57) ABSTRACT

A device, system and method for performing an uncontrolled handover in a mobile station, a ranging request message including an identifier of a serving base station and a first identifier used in the serving base station is transmitted to a first target base station to perform network (re)entry to the first target base station, and a ranging response message including security information and a second identifier for identifying the mobile station is received from the first target base station.

12 Claims, 9 Drawing Sheets

(56) References Cited

U.S. PATENT DOCUMENTS

| | | |
|---|---|---|
| 2010/0118833 A1 | 5/2010 | Hahn et al. |
| 2010/0248615 A1 | 9/2010 | Oguchi |
| 2011/0039563 A1* | 2/2011 | Youn et al. ............... 455/436 |
| 2012/0002589 A1 | 1/2012 | Saifullah et al. |

FOREIGN PATENT DOCUMENTS

| | | |
|---|---|---|
| JP | 2010-239226 A | 10/2010 |
| WO | WO 2007/046630 A2 | 4/2007 |
| WO | WO 2008/138969 A1 | 11/2008 |

* cited by examiner

METHOD FOR PERFORMING UNCONTROLLED HANDOVER

CROSS REFERENCE TO RELATED APPLICATIONS

The present application is a 37 C.F.R. §1.53(b) continuation of U.S. patent application Ser. No. 12/627,450 filed Nov. 30, 2009, now U.S. Pat. No. 8,259,678 which claims priority on Korean Application No. 10-2009-0068851, filed Jul. 28, 2009, and which claims priority to U.S. Provisional Application No. 61/169,287, filed on Apr. 14, 2009, the entire contents of all which are hereby incorporated by reference and for which priority is claimed under 35 U.S.C. §120.

BACKGROUND OF THE INVENTION

1. Field of the Invention

The present invention relates to a method and apparatus for performing an efficient and reliable handover, for application to a variety of wireless access systems.

2. Discussion of the Background Art

A brief description will be made below of a conventional HandOver (HO) and ranging procedure.

HO is the process of maintaining a call in progress without interruption, when a Mobile Station (MS) moves from the cell area (or communication zone) of its serving Base Station (BS) to that of another BS during the call. In other words, HO is a function of ensuring the continuity of an on-going call by channel or link switching.

There are three types of HO: softer HO, soft HO, and hard HO.

Softer HO is an HO that takes place within the same cell. In softer HO, an MS switches to a better channel among channels in use within cell coverage.

Soft HO is an HO characterized by simultaneous use of two adjacent channels and gradual termination of one of the channels in the end. In Code Division Multiple Access (CDMA), soft HO is readily implemented due to use of the same frequency band.

Hard HO is a type of HO procedure in which an old channel is disconnected immediately before a new channel is established.

To move from a cell area of a serving BS to a cell area of a target BS and perform a handover to the target BS, the MS may perform a ranging procedure.

Ranging refers to a set of processes for maintaining the connection quality (especially synchronization) of Radio Frequency (RF) communication between the MS and the BS in Institute of Electrical and Electronics Engineers (IEEE) 802.16 or Mobile Internet. In multiple access based on Orthogonal Frequency Division Multiple Access/Time Division Duplexing (OFDMA/DD), ranging does not matter for the downlink because the BS transmits signals to a plurality of MSs at a single reference timing.

On the other hand, a plurality of MSs transmit signals individually on the uplink, resulting in different propagation delays. Therefore, ranging is carried out between the BS and an MS by a separate timing synchronization scheme for the uplink. That is, ranging is a procedure by which a plurality of MSs correct their transmission timings.

For the purpose of uplink synchronization acquisition and power control between the MS and the BS, initial ranging, periodic ranging, and HO ranging are defined. Also, Bandwidth Request (BR) ranging is defined for the MS to request a bandwidth to the BS.

Initial ranging occurs for an initial network entry and connection procedure, when the MS initially enters the BS, for example, when the MS is power-on or it transitions from a long sleep mode to an idle mode. Periodic ranging is performed periodically for the MS to track synchronization to the BS. To acquire synchronization with a target BS during handover, the MS performs HO ranging. BR ranging is used to request allocation of uplink resources to the BS. Only after acquiring system synchronization, the MS performs BR ranging.

Upon receipt of a ranging request message from the MS, the BS generates a Connection IDentifier (CID) for the MS. Then the BS performs re-negotiations, re-authorization, and re-registration, etc. with the MS.

A CID is an address that identifies a connection mapped to a required service flow between peers at a Medium Access Control (MAC) sublayer. The CID is included in a MAC Protocol Data Unit (PDU). That is, every connection between the BS and the MS is identified by a CID in a MAC header and the CID is mapped to a Service Flow IDentifier (SFID) that defines Quality of Service (QoS) parameters of the service flow associated with the CID.

Each MS may be allocated management CIDs from the BS during the MS's access to the BS, namely initialization. That is, the MS may be allocated management CIDs from the BS during a series of ranging and registration procedures. The management CIDs may be classified into a Basic CID (BCID), a Primary CID (CID), and a Secondary CID (SCID).

The BCID is used for the BS to identify the MS during an initial access. That is, the MAC address of the MS is mapped to the BCID. The PCID may be used for an authorization message and dynamic resource allocation-related messages. The SCID is optional and whether the SCID will be used may be determined during an MS capabilities negotiation.

Besides the management CIDs, there are a Transport CID (TCID) for identifying a service of user traffic, a broadcasting CID for identifying broadcast traffic, and a multicast CID. A TCID may be allocated to each connection established between the MS and the BS.

HandOver (HO) is a technology for enabling an MS to continue its on-going communication in a target BS by transitioning data contexts in which the MS was communicating with a serving BS to the target BS with a minimal interruption time, when the MS moves from the serving BS to the target BS. That is, HO ensures the continuity of a service that the MS is receiving.

Aside from normal handover, there are no specified procedures for uncontrolled handover. Moreover, during the uncontrolled handover, the MS should transmit its MAC address to the target BS to perform a ranging procedure. In this case, it may be difficult to guarantee location privacy for the MS.

That is, it is necessary to consider procedures for guaranteeing the location privacy of the MS to protect the MS against malicious security threats during the uncontrolled handover.

To provide location privacy to the MS, a hashed MAC address and a temporary STation ID (STID) may be used for the MS. However, since the hashed MAC address and/or the temporary STID should be allocated to the MS during ranging, the ranging procedure may be unnecessarily prolonged.

SUMMARY OF THE INVENTION

An object of the present invention devised to solve the problem lies on a method and apparatus for performing an efficient and reliable handover.

Another object of the present invention devised to solve the problem lies on a method for supporting location privacy for an MS, when the MS performs uncontrolled handover.

A further object of the present invention devised to solve the problem lies on a method for being efficiently allocated an STID for use in a target BS by an MS, when the MS performs an uncontrolled handover from a serving BS to the target BS.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

To solve the above technical problems, the present invention provides various methods and apparatuses for performing an efficient and reliable HO, for application to a variety of wireless access system.

In exemplary embodiments of the present invention, an uncontrolled HO may be performed when a first target BS is not included in candidate BSs recommended by a serving BS, or when the MS fails in an HO ranging procedure with a target BS, that is, the target BS is unreachable by the MS.

The objects of the present invention can be achieved by providing a system, device and method for performing an uncontrolled handover in an MS, the method including transmitting to the first target BS a ranging request message including an ID of a serving BS and a first ID used in the serving BS to perform network (re)entry, and receiving a ranging response message including valid security information and a second ID for identifying the MS from the first target BS.

The method may further include receiving a handover command message including handover information and information about candidate BSs from the serving BS. The handover information may include at least one of an action time parameter indicating a start of the network entry or reentry, a dedicated handover ranging code used in a candidate BS, and a ranging opportunity used in the candidate BS.

If the MS station performs the uncontrolled handover, the method may further include transmitting to the serving BS a handover indication message including an event code indicating the uncontrolled handover and an ID of the first target BS being the preferred target BS of the MS.

The first identifier may be a station identifier (STID) uniquely identifying the mobile station in the serving base station, and the second identifier may be one of a station identifier uniquely identifying the mobile station in the first target base station and a temporary station identifier used to protect location privacy of the mobile station.

The method may further include transmitting a ranging code to the first target BS to perform the network (re)entry, and receiving a ranging response message including allocation information about a resource region allocated for a ranging procedure, as a response to the ranging code. The ranging request message may be transmitted in the resource region indicated by the allocation information.

The valid security information can be able to include a Cipher-based message authentication code (CMAC) tuple.

In another aspect of the present invention, provided herein is a system, device and method for performing an uncontrolled handover, the method including receiving a ranging request message including an ID of a serving BS and a first ID used in the serving BS from an MS during network (re)entry with the MS, and transmitting to the MS a ranging response message including security information valid in a target BS and a second ID for identifying the MS.

The first identifier may be a station identifier (STID) uniquely identifying the mobile station in the serving base station, and the second identifier may be one of a station identifier uniquely identifying the mobile station in the first target base station and a temporary station identifier used to protect location privacy of the mobile station.

The valid security information may include a Cipher-based message authentication code (CMAC) tuple.

The method may further include receiving a ranging code from the MS to perform the network (re)entry, and transmitting to the MS a ranging response message including allocation information about a resource region allocated for a ranging procedure, as a response to the ranging code. The ranging request message may be received in the resource region indicated by the information.

The method may further include transmitting a request message requesting information about the MS to the serving BS identified by the ID of the serving BS, and receiving a response message including the information about the MS from the serving BS. The information about the MS may include a MAC address of the MS.

In a further aspect of the present invention, provided herein is an MS for performing an uncontrolled handover, the MS including a transmission module for controlling transmission of messages used for the uncontrolled handover, a reception module for controlling reception of messages used for the uncontrolled handover, a memory for storing parameters and information elements used for the uncontrolled handover, and a processor for controlling the uncontrolled handover. The processor may control the uncontrolled handover by transmitting a ranging request message to a first target BS through the transmission module to perform network (re)entry to the first target BS, the ranging request message including an ID of a serving BS and a first ID used in the serving BS and by receiving a ranging response message including valid security information and a second ID for identifying the mobile station from the first target BS through the reception module.

The reception module may receive a handover command message including handover information and information about candidate BSs from the serving BS and transmit the handover command message to the processor. The processor may store the handover information in the memory and perform the uncontrolled handover based on the handover information.

The handover information may include at least one of an action time parameter indicating a start of the network (re) entry, a handover ranging code used in a candidate base station, and a ranging opportunity used in the candidate base station.

If the MS performs the uncontrolled handover, the processor transmits a handover indication message including an event code indicating the uncontrolled handover and an ID of the first target BS being the preferred target BS of the MS to the serving BS through the transmission module.

The first identifier may be a station identifier (STID) uniquely identifying the mobile station in the serving base station, and the second identifier may be one of a station identifier uniquely identifying the mobile station in the first target base station and a temporary station identifier used to protect location privacy of the mobile station.

The valid security information may include a Cipher-based message authentication code (CMAC) tuple.

The processor may control the uncontrolled handover by transmitting a ranging code to the first target BS through the transmission module to perform the network (re)entry and receiving a ranging response message including allocation information about a resource region allocated for a ranging procedure through the reception module, as a response to the ranging code. The processor may control the transmission module to transmit the ranging request message in the resource region indicated by the allocation information.

In a further aspect of the present invention, provided herein is an method for performing an uncontrolled handover in a mobile communications terminal, the method comprises the steps of determining whether or not a resource retain timer of a serving base station has expired; if the resource retain timer has not expired, initiating the uncontrolled handover by transmitting a ranging request message to a target base station to perform network (re)entry to the target base station, the ranging request message including an identifier of the serving base station and a first temporary identifier for identifying the mobile communications terminal by the serving base station; and receiving a ranging response message from the target base station, the ranging response message including security information and a second temporary identifier for identifying the mobile communications terminal by the target base station.

The method further comprises a step of initiating the uncontrolled handover when the target base station is previously determined to be a preferred target base station of the mobile communications terminal and the target base station is not a candidate base station recommended by the serving base station, or when the mobile communications terminal cannot reach any candidate base station recommended by the serving base station.

The method further comprises a step of receiving a handover command message from the serving base station, the handover command message including handover information and information about the candidate base station.

The handover information may include at least one of an action time parameter indicating a start of the network (re)entry, a handover ranging code used in the candidate base station, and a ranging opportunity used in the candidate base station.

The method further comprises a step of transmitting a handover indication message to the serving base station, the handover indication message including an event code indicating a start of the uncontrolled handover and an identifier that identifies the target base station as being the preferred target base station of the mobile communications terminal.

The method further comprises steps of transmitting a ranging code to the target base station to perform the network (re)entry; and receiving a ranging response message including allocation information about a resource region allocated for a ranging procedure, as a response to the ranging code, wherein the ranging request message is transmitted in the resource region indicated by the allocation information.

The security information may include a Cipher-based message authentication code (CMAC) tuple.

The method further comprises, a step of transmitting a second ranging request message to the target base station to perform network (re)entry to the target base station, the ranging request message including a permanent identifier of the mobile terminal, when the resource retain timer has not expired; and receiving a ranging response message from the target base station, the ranging response message including security information and a third temporary identifier for identifying the mobile communications terminal.

In a further aspect of the present invention, provided herein is a method for performing an uncontrolled handover between a mobile communications terminal, a serving base station and a target base station, comprising: if a resource retain timer of the serving base station has not expired, initiating the uncontrolled handover upon receiving at the target base station a ranging request message from the mobile communications terminal, including a request from the mobile communications terminal to perform network (re)entry to the target base station, the ranging request message including an identifier of the serving base station and a first temporary identifier for identifying the mobile communications terminal by the serving base station; and transmitting a ranging response message from the target base station to the mobile communications terminal, the ranging response message including security information and a second temporary identifier for identifying the mobile communications terminal by the target base station.

The uncontrolled handover is able to being initiated by the mobile communications terminal when the mobile communications terminal has previously determined the target base station to be a preferred target base station of the mobile communications terminal and the target base station is not a candidate base station recommended by the serving base station, or when the mobile communications terminal cannot reach any candidate base station recommended by the serving base station.

The method further comprises a step of transmitting handover information and base station information from the target base station to the serving base station for inclusion in a handover command message to be transmitted by the serving base station to the mobile communications terminal.

The handover information may includes at least one of an action time parameter indicating a start of the network (re)entry, a handover ranging code used in the candidate base station, and a ranging opportunity used in the target base station.

The method further comprises steps of receiving in the target base station a ranging code from the mobile communications terminal to perform the network (re)entry; and transmitting, from the target base station to the mobile communications terminal, a ranging response message including allocation information about a resource region allocated for a ranging procedure, as a response to the ranging code, wherein the ranging request message is transmitted in the resource region indicated by the allocation information.

The security information may include a Cipher-based message authentication code (CMAC) tuple.

The method further comprises steps of receiving, from the mobile communications terminal at the target base station, a second ranging request message to perform network (re)entry to the target base station, when the resource retain timer has not expired, and wherein the ranging request message including a permanent identifier of the mobile terminal; and transmitting a ranging response message from the target base station to the mobile communications terminal, the ranging response message including security information and a third temporary identifier for identifying the mobile communications terminal.

In a further aspect of the present invention, provided herein is a mobile communications terminal configured to perform uncontrolled handover, comprising: a transmitter module; a receiver module; a memory; and a processor operatively connected to the transmitter module, the receiver module and the memory, the processor configured to determine whether or not a resource retain timer of a serving base station has expired.

If the resource retain timer has not expired, the processor of the mobile communications terminal initiates the uncontrolled handover by transmitting a ranging request message to a target base station to perform network (re)entry to the target base station, the ranging request message including an identifier of the serving base station and a first temporary identifier for identifying the mobile communications terminal by the serving base station, and receives a ranging response message from the target base station, the ranging response message including security information and a second temporary identifier for identifying the mobile communications terminal by the target base station.

The processor is configured to initiate the uncontrolled handover when the target base station is previously determined to be a preferred target base station of the mobile communications terminal and the target base station is not a candidate base station recommended by the serving base station, or when the mobile communications terminal cannot reach any candidate base station recommended by the serving base station.

The processor is further configured to receive a handover command message from the serving base station, the handover command message including handover information and information about the candidate base station.

The handover information may include at least one of an action time parameter indicating a start of the network (re) entry, a handover ranging code used in the candidate base station, and a ranging opportunity used in the candidate base station.

The processor is able to being configured to transmit a handover indication message to the serving base station, the handover indication message including an event code indicating a start of the uncontrolled handover and an identifier that identifies the target base station as being the preferred target base station of the mobile communications terminal.

The processor is able to being configured to transmit a ranging code to the target base station to perform the network (re)entry, and receive a ranging response message including allocation information about a resource region allocated for a ranging procedure, as a response to the ranging code, and wherein the ranging request message is transmitted in the resource region indicated by the allocation information.

The security information may include a Cipher-based message authentication code (CMAC) tuple. If the resource retain timer has not expired, the processor is configured to transmit a second ranging request message to the target base station to perform network (re)entry to the target base station, the ranging request message including a permanent identifier of the mobile terminal, and receive a ranging response message from the target base station, the ranging response message including security information and a third temporary identifier for identifying the mobile communications terminal. The foregoing aspects of the present invention are merely part of preferred embodiments of the present invention and thus it is to be understood to those skilled in the art that various embodiments reflecting the technical aspects of the present invention can be implemented based on the following detailed description of the present invention.

Exemplary embodiments of the present invention have the following effects.

Firstly, a user can perform an efficient and reliable HO.

Secondly, when an MS performs an uncontrolled HO, the location privacy of the MS can be supported.

Thirdly, when an MS performs an uncontrolled HO, an STID can be efficiently allocated to the MS, for use in a target BS.

It will be appreciated by persons skilled in the art that the effects that could be achieved with the present invention are not limited to what has been particularly described hereinabove and the above and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE INVENTION

Figure 1:
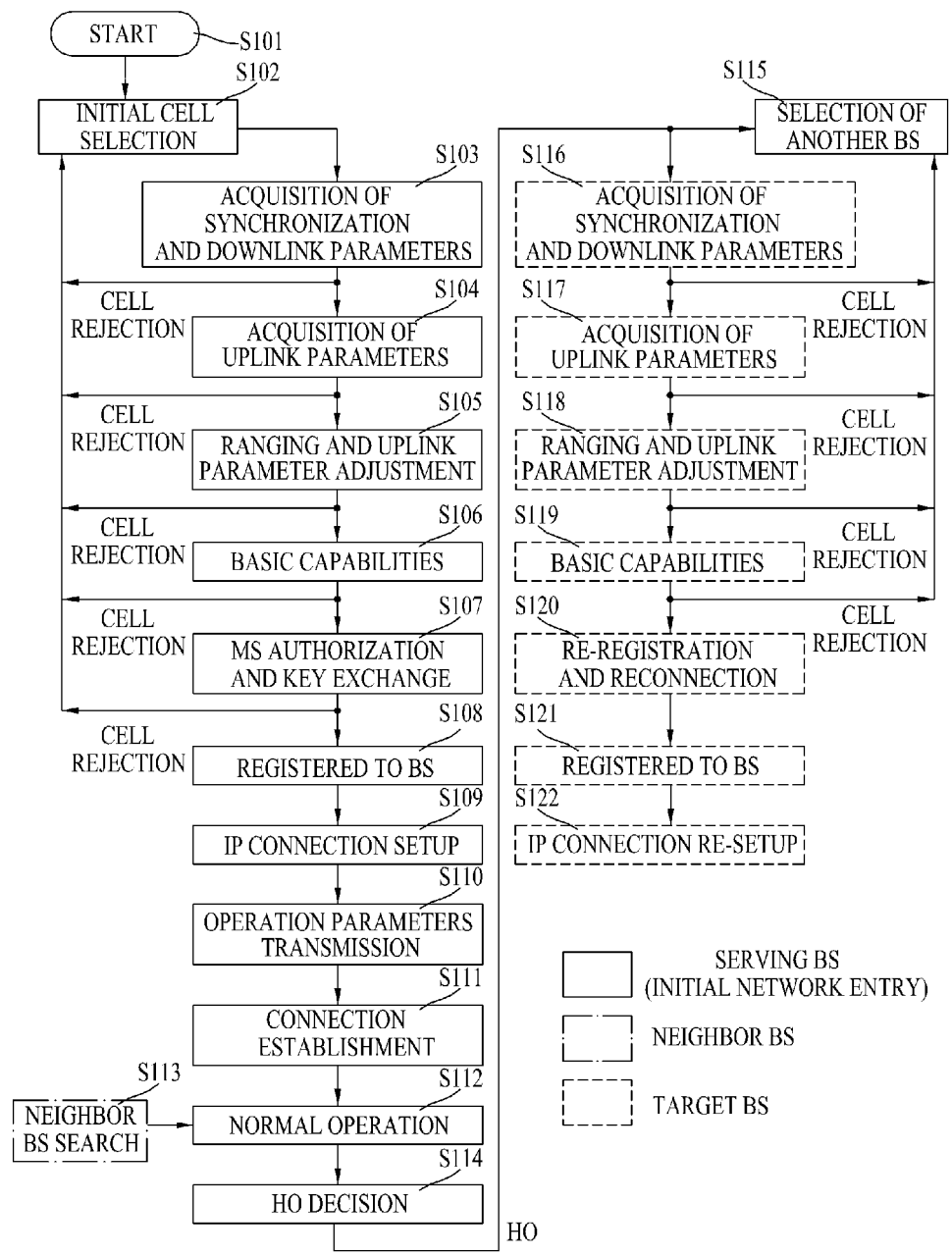
FIG. 1 is a flowchart illustrating an overall HandOver (HO) procedure in an Institute of Electrical and Electronics Engineers (IEEE) 802.16e system.

Exemplary embodiments of the present invention provide a variety of methods and apparatuses for performing an efficient and reliable handover, for application to various wireless access systems.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the attached drawings, a detailed description of procedures or steps that might obscure the subject matter of the present invention will be omitted. Also, procedures or steps that may be understood by those skilled in the art will not be described.

In exemplary embodiments of the present invention, a description is made of a data transmission and reception relationship between a BS and an MS. Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)' or 'Advanced Base Station (ABS), 'access point', etc.

Also, the term 'MS' may be replaced with the term 'User Equipment (UE)', 'Subscribe Station (SS)', Mobile Subscriber station, 'mobile terminal, 'Advanced Mobile Station (AMS)' or 'terminal', etc.

A transmitter is a fixed and/or mobile node that provides data or voice service and a receiver is a fixed and/or mobile node that receives data or voice service. Therefore, an MS may be a transmitter and a BS may be a receiver, for an uplink. For a downlink, the MS may be a receiver and the BS may be a transmitter.

The exemplary embodiments of the present invention may be supported by standard documents disclosed for at least one of an Institute of Electrical and Electronics Engineers (IEEE) 802 system, a $3^{rd}$ Generation Partnership Project (3GPP) system, a 3GPP Long Term Evolution (LTE) system, and a 3GPP2 system. That is, steps or parts that are not described herein to clarify the subject matter of the present invention in the exemplary embodiments of the present invention may be supported by the documents.

All terms used in the specification may be described according to the standard documents. Especially, the exemplary embodiments of the present invention may be supported by at least one of the following IEEE 802.16 standard documents, P802.16e-2004, P802.16e-2005, P802.16Rev2, and P802.16m, the entire contents of which being incorporated herein by reference.

Now, the above and other aspects of the present invention will be described in detail through preferred embodiments with reference to the accompanying drawings. The detailed description is intended to explain exemplary embodiments of the present invention, rather than to show the only embodiments that can be implemented according to the invention.

Specific terms used in the exemplary embodiments of the present invention are provided to help better understanding of the present invention, and these specific terms may be replaced with other terms within the scope of the present invention.

For example, the term 'uncontrolled Handover (HO)' may be interchangeably used with 'un-coordinated HO' or 'uncooperative HO'.

FIG. 1 is a flowchart illustrating an overall HO procedure in an Institute of Electrical and Electronics Engineers (IEEE) 802.16e system.

Referring to FIG. 1, an MS selects a cell during an HO and initial network entry in steps S101 and S102. The cell selection is the process of scanning or ranging one or more BSs to search for an ABS with which the MS will establish a network connection or perform an HO. The MS should schedule a scanning interval or a sleeping interval to make a decision as to whether a BS is available for initial network entry or as a target BS for an HO.

In step S103, the MS acquires synchronization to a service BS and receives downlink parameters from the service BS during the initial network entry. The service BS refers to a BS that provides a service in a network that the MS intends to enter at the moment. The service BS may be called a serving BS. After acquiring synchronization to the service BS, the MS acquires uplink parameters from the service BS in step S104 and adjusts the uplink parameters by performing a ranging procedure with the service BS in step S105. The MS and the service BS have established basic capabilities for communications between them in the above procedure in step S106. In step S107, the service BS authorizes the MS and exchanges encryption keys with the MS. Thus, the MS is registered to the service BS in step S108 and an Internet Protocol (IP) connection is established between them in step S109.

The service BS transmits operation parameters to the MS so that the MS may perform a communication procedure in step S110 and a connection is established between the MS and the service BS in step S111. The MS and the service BS are now capable of normal operations in step S112. In step S113, the MS searches neighbor BSs continuously even during a normal operation with the BS.

The reason for performing step S113 is to search for a neighbor BS that may provide a better service, as the MS gets farther from the service BS during movement and thus the quality of a service from the service BS is decreased. This neighbor BS is called a target BS and the MS may perform an HO by searching for the target BS.

In general, HO occurs when an MS moves from a service BS to a target BS. The HO is the process of switching a radio interface, a service flow, a network access point, etc. from the service BS to the target BS by the MS. In step S114, the HO starts with a decision on an HO made by the MS, the service BS, or a network manager.

The MS selects a target BS in step S115. In step S116, the MS acquires synchronization to the target BS and downlink parameters from the target BS. The MS acquires uplink parameters from the target BS in step S117 and ranges the target BS and adjusts the uplink parameters with the target BS in step S118. If the MS has already received an NBR-ADV message including an Identifier (ID) and frequency of the target BS, and an Uplink/Downlink Channel Descriptor (UCD/DCD), the scanning and synchronization procedure may be simplified. If the target BS has received an HO notification from the service BS over a backbone network, it may provide a non-contention-based initial ranging opportunity to the MS by an Uplink-MAP (UL-MAP) message.

In step S119, the MS and the target BS have established basic capabilities in the above procedure. The MS and the target BS start a network re-entry procedure by ranging. In step S120, the MS performs re-registration and re-establishes a connection with the target BS. Thus, the MS is registered to the target BS in step S121 and an IP connection is re-established between the MS and the target BS in step S122. The target BS is now the service BS of the MS and capable of providing a service to the MS.

Regarding the HO in FIG. 1, the MS may select a cell based on information about neighbor BSs acquired by scanning and decide on an HO from the service BS to a target BS. After the HO decision, the MS acquires synchronization to the target BS and performs a ranging procedure with the target BS. The MS is then re-authorized. During the re-authorization, the target BS may request information about the MS to the service BS by a backbone message.

A handover and network re-entry procedure may be simplified significantly depending on information about the MS that the target BS preserves. Also, some network entry procedures may be omitted according to the amount of the MS information that the target BS has.

While an MS-initiated HO has been mainly described in FIG. 1, the serving BS may determine whether the MS is to perform an HO, taking into account the communication status between the MS and the serving BS. Even when the serving BS decides on the HO, the HO may be performed in a similar manner to the procedure illustrated in FIG. 1.

HO in IEEE 802.16m

Figure 2:
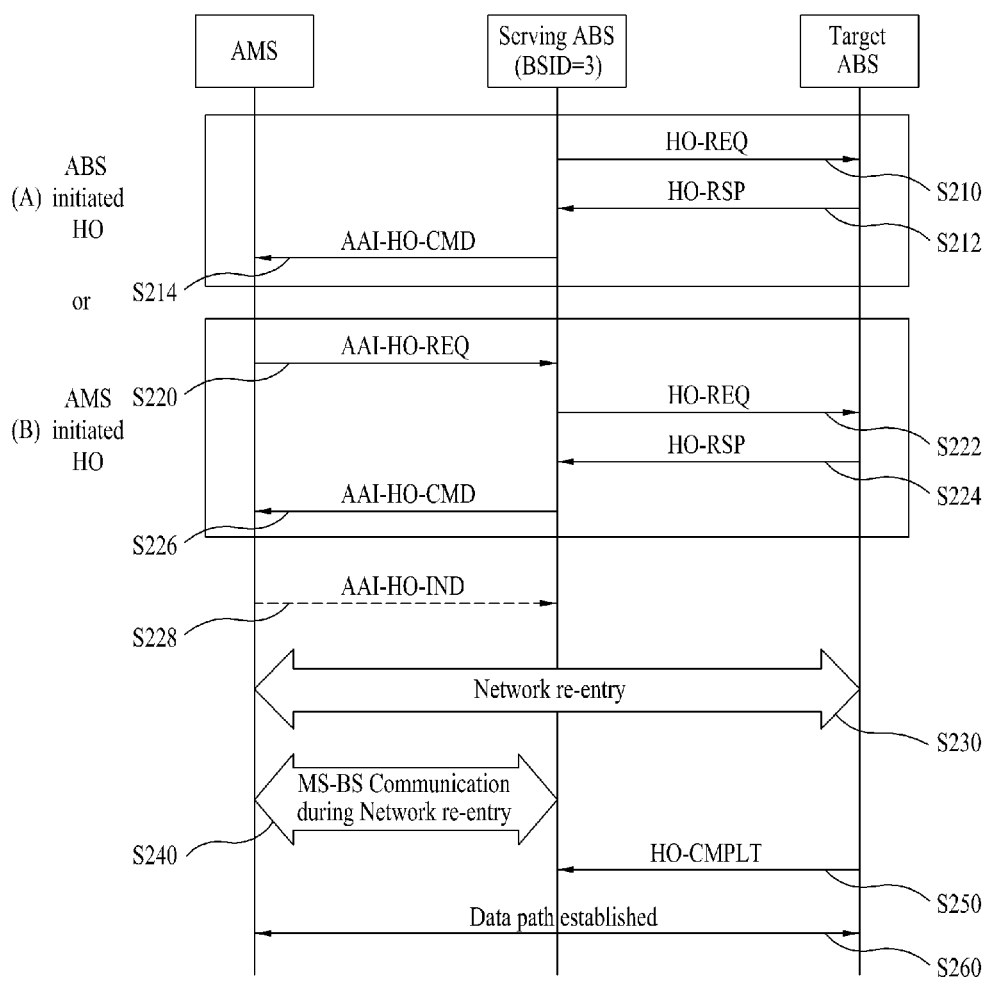
FIG. 2 is a diagram illustrating a signal flow for an overall HandOver (HO) procedure in an IEEE 802.16m system.

FIG. 2 is a diagram illustrating a signal flow for an overall HO procedure in an IEEE 802.16m system.

In the IEEE 802.16m system, an HO procedure may largely involve (1) HO decision and initiation, (2) HO preparation, and (3) HO execution.

Before performing these three procedures, an AMS needs to perform a scanning procedure in which it collects information about neighbor Advanced Base Stations (ABSs). The scanning procedure is similar to the scanning procedure in the IEEE 802.16e network. For example, when there is a non-communication period in which the AMS does not communicate with a Serving ABS (S-ABS), the AMS may scan neighbor ABSs during the non-communication period.

In the HO decision and initiation procedure, either the AMS or the S-ABS may initiate an HO. In the IEEE 802.16m system, the MS initiates an HO under the following conditions.

1. A condition that defines when the AMS will report scanning measurements to the S-ABS.
2. HO initiation by transmitting an AAI_HO-REQ message by the AMS.
3. A condition that defines when the AMS cannot maintain communication with the S-ABS.

When the AMS performs an HO to a Target ABS (T-ABS), the S-ABS determines whether Entry Before Break (EBB) or Break Before Entry (BBE) is to be performed.

In FIG. 2, part (A) indicates an S-ABS-initiated HO and part (B) indicates an AMS-initiated HO.

Referring to part (A) of FIG. 2, the S-ABS may negotiate a condition for HO execution and resources to be allocated to the AMS with one or more T-ABSs in order to perform a coordinated HO.

The S-ABS may transmit AMS information to the one or more T-ABSs by an HO-REQ message in step S210.

Each of the one or more T-ABSs may transmit to the S-ABS HO information including at least one of a dedicated ranging code and a ranging opportunity that are available to the AMS in the T-ABS by an HO-RSP message in step S212. The HO-RSP message may further include at least one of a Station ID (STID) for use in the T-ABS and a security context (e.g. nonce).

The S-ABS may transmit to the AMS HO information about the one or more candidate ABSs (e.g. target BSs) by a handover command (AAI_HO-CMD) message in step S214.

The AAI_HO-CMD message may further include action time and disconnect time parameters. The action time parameter indicates a time when the AMS is supposed to perform network re-entry and the disconnect time parameter indicates a time when the S-ABS is supposed to release uplink and downlink resources from the AMS.

Referring to part (B) of FIG. 2, when an HO condition is satisfied, the AMS may request an HO to the S-ABS by a handover request (AAI_HO-REQ) message in step S220.

Upon receipt of the AAI_HO-REQ message from the AMS, the S-ABS may transmit an HO-REQ message including AMS information about the AMS to the one or more candidate ABSs in step S222.

Steps S224 and S226 are identical to steps S212 and S214 and thus a redundant description of steps S224 and S225 will not be provided herein. Steps S210, S212, S214, S220, S222, S224 and S226 may correspond to the HO preparation procedure. The STID of the AMS may be updated preliminarily between the AMS and the T-ABSs and the security context (e.g. nonce) of the AMS may be updated in advance through transmission and reception of security information between the AMS and the T-ABSs, in the HO preparation procedure. Also, dedicated ranging codes may be allocated to the AMS, for use in the T-ABSs.

After the HO preparation procedure, the AMS may selectively transmit an AAI_HO-IND message to the S-ABS in step S228.

The AAI_HO-IND message may include an event code described in Table 1 below.

TABLE 1

| Syntax | Size | Note |
|---|---|---|
| AAI_HO-IND(){ | | |
| ~ | ~ | ~ |
| Code | variable | Code 1: T-BAS selection for multiple candidate T-ABS case.<br>Code 2: All target ABSs in AAI_HO-CMD are unreachable.<br>Code 3: AMS unable to stay connection to serving ABS until expiration of disconnection time<br>Code 4: HO cancellation |
| ~ | ~ | ~ |
| } | | |

Referring to Table 1, when the AMS transmits the AAI_HO-IND message to the S-ABS, it may set an event code in the AAI_HO-IND message. If the event code is set to '1' (=Code 1), it means that the AMS has selected one of a plurality of candidate ABSs. If the event code is set to '2' (=Code 2), this implies that the AMS cannot reach any of the candidate ABSs and the AMS may perform an uncontrolled HO procedure later. In this case, the AMS includes a newly selected T-ABS in the AAI_HO-IND message.

If the event code is set to '3' (=Code 3), this implies that the AMS cannot maintain the connection to the S-ABS until a disconnect time set by the S-ABS expires. If the event code is set to '4' (=Code 4), this implies that the AMS cancels the HO.

That is, when the AMS receives an AAI_HO-CMD message including HO information about a plurality of candidate ABSs from the S-ABS, the AMS notifies the S-ABS of a final target ABS to which the AMS will perform the HO by an AAI_HO-IND message.

If the S-ABS sets only one candidate ABS in the AAI_HO-CMD message, the AMS does not need to notify the S-ABS of its chosen T-ABS by the AAI_HO-IND message. When the HO is cancelled or some problem occurs to the HO during the HO, the AMS may also transmit information about the HO cancellation or the HO problem to the S-ABS by the AAI_HO-IND message. That is, the AAI_HO-IND message is optional, not mandatory.

The HO execution procedure may be carried out at a time indicated by the action time parameter. That is, the AMS may perform a network re-entry procedure with the T-ABS at the time indicated by the action time parameter in step S230.

The AMS may transmit a CDMA ranging code or an AAI_RNG-REQ message to the T-ABS at the action time to perform the network re-entry procedure in step S230.

In case of EBB, the AMS may communicate with the S-ABS during a predetermined Available Interval (AI) during the network re-entry. Meanwhile, during an Un-Available Interval (UAI), the AMS may perform the network re-entry to the T-ABS in step S240.

On the other hand, in case of BBE, the AI or the UAI is not determined. Therefore, the AMS operates in the same manner as for hard HO in the legacy IEEE 802.16e network.

Upon completion of the network re-entry, the T-ABS transmits an HO-CMPLT message to the S-ABS in step S250 and a data path is established between the AMS and the T-ABS in step S260.

The HO procedure illustrated in FIG. 2 may be called a controlled HO or coordinated HO. The messages and parameters as described with reference to FIG. 2 may be applicable to the following exemplary embodiments of the present invention. Under certain conditions, the messages and parameters may be changed or modified.

Uncontrolled HO

An uncontrolled or uncoordinated HO may occur to the AMS during a coordinated HO procedure in progress. In this case, the AMS should perform ranging with the T-ABS in the same manner as for initial network entry.

There are largely two types of uncontrolled or uncoordinated HO. A first type, Type 1 occurs when the AMS prefers none of candidate ABSs that the S-ABS set in the AAI_HO-CMD message (a case of an uncoordinated ABS). A second type, Type 2 is triggered when the AMS has attempted network re-entry to the T-ABS but failed in transmitting a CDMA ranging code to the T-ABS or transmitting and receiving ranging messages to and from the T-ABS (a case of an unreachable T-ABS).

Figure 3:
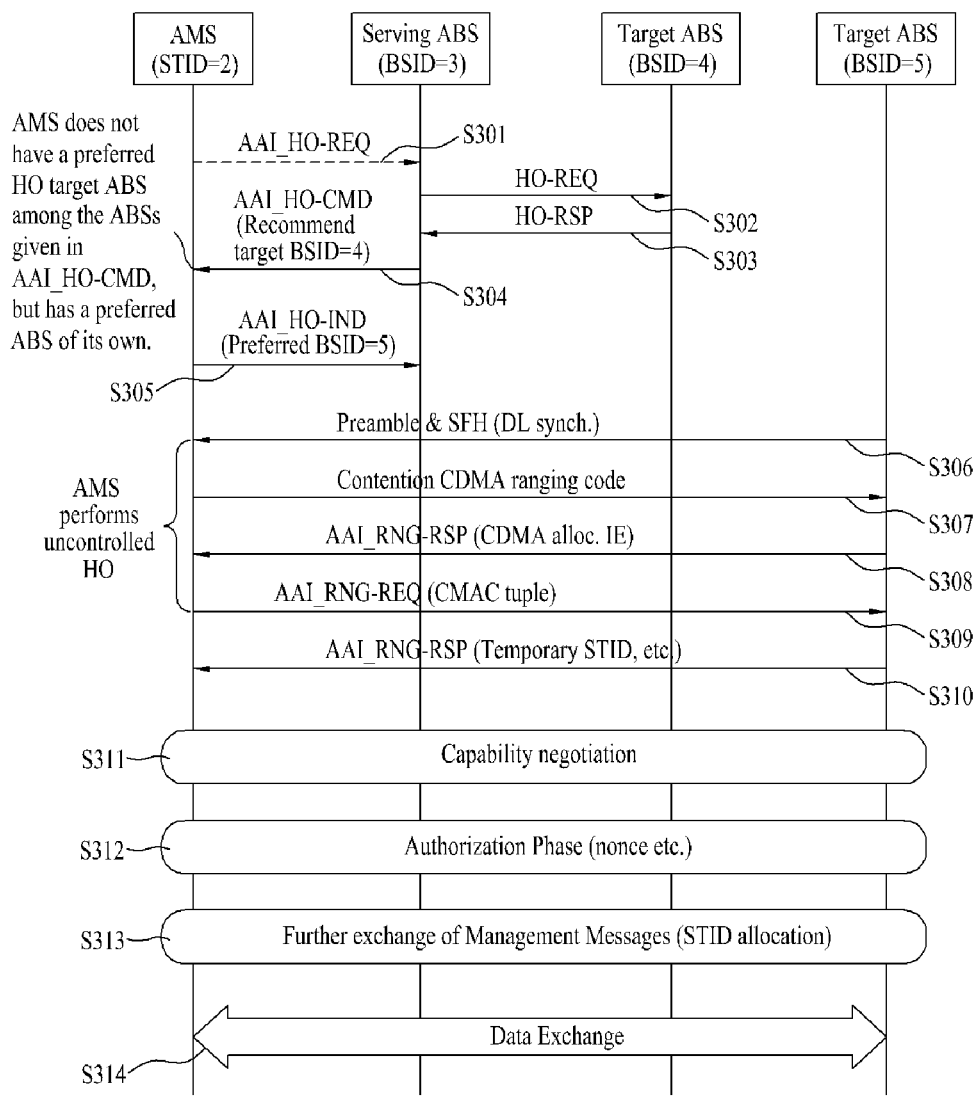
FIG. 3 is a diagram illustrating a case where a Mobile Station (MS) performs an uncontrolled HO to a preferred neighbor BS.

FIG. 3 is a diagram illustrating a case where the AMS performs an uncontrolled HO of Type 1 to its preferred neighbor ABS.

It is assumed in FIG. 3 that an STID of 2 is allocated to the AMS, a BSID of the S-ABS is 3, and first and second T-ABSs among candidate ABSs have a BSID of 4 and a BSID of 5, respectively.

Referring to FIG. 3, the AMS may transmit an AAI_HO-REQ message to the S-ABS to initiate an HO in step S301. NINA Step S301 may be performed only in case of an AMS-initiated HO, not in case of an ABS-initiated HO. In other words, step S301 is optional according to an HO situation.

The S-ABS with BSID=3 may transmit an AAI_HO-REQ message including AMS information about the AMS to one or more candidate ABSs. The AMS information may include a MAC address and/or an AMS context of the AMS, etc. For notational simplicity, it is assumed that the S-ABS transmits an HO-REQ message to the first T-ABS with BSID=4 in step S302.

The first T-ABS with BSID=4 may transmit an HO-RSP message including HO information such as a dedicated ranging code, a ranging opportunity, an action time parameter, a UAI/AI, etc. for use in network re-entry of the AMS to the S-ABS over the backbone network in step S303.

Also, the HO-RSP message may further include an action time parameter indicating a time when network entry is performed and/or a resource retain time parameter indicating a time period for which information associated with the S-ABS is maintained.

The S-ABS may transmit an AAI_HO-CMD message including HO information and information about recommended candidate ABSs to the AMS in step S304. The information about recommended candidate ABSs may be IDs of the recommended candidate ABSs (e.g. BSID=4) or a list of the recommended candidate ABSs.

The AMS may prefer a T-ABS other than the recommended candidate ABSs set in the AAI_HO-CMD message. The AMS may then transmit an AAI_HO-IND message including an event code set to 2 (Code 2) and the ID of a preferred T-ABS, BSID=5 to the S-ABS in step S305. In this manner, the AMS may perform an uncontrolled HO to the second T-ABS (BSID=5).

Because an HO preparation procedure has not been carried out between the second T-ABS with BSID=5 and the S-ABS, the second T-ABS and the AMS may not update security information and/or the STID of the AMS in advance. As a consequence, the location privacy of the AMS may be vulnerable to violation.

To support the location privacy of the AMS, the AMS and the second T-ABS should perform a network re-entry procedure by use of a hashed MAC address, or the MAC address and temporary STID of the AMS. In this situation, without coordination between the S-ABS and the second T-ABS, a security context associated with the AMS is not shared between the two ABSs. Therefore, no HO optimization is performed.

The AMS may move into the cell area of the second T-ABS with BSID=5 that it prefers and receive a preamble or a SuperFrame Header (SFH) broadcast periodically from the second T-ABS. That is, the AMS may acquire downlink synchronization to the second T-ABS using the preamble or the SFH in step S306.

In step S307, the AMS may transmit a contention-based CDMA ranging code to the second T-ABS in the earliest ranging opportunity after the downlink synchronization acquisition in order to perform the network re-entry to the second T-ABS.

Upon receipt of the CDMA ranging code, the second T-ABS may allocate a resource area to the AMS, in which the AMS and the T-ABS will transmit and receive ranging messages. Thus, the second T-ABS may transmit an AAI_RNG-RSP message including information about the allocated radio resources to the AMS in step S308.

The AMS may transmit an AAI_RNG-REQ message in the allocated resource area to the second T-ABS in step S309. The AAI_RNG-REQ message may include a valid Cipher-based Message Authentication Code (CMAC) tuple.

The second T-ABS may transmit to the AMS a temporary STID that the AMS will use in the second T-ABS and a CMA tuple valid in the second T-ABS in step S310.

The AMS and the second T-ABS may negotiate capabilities using the temporary STID in step S311 and may update a nonce in an authorization phase in step S312.

The second T-ABS may also allocate an AMS-specific STID to the AMS by exchanging management messages with the AMS in step S313.

The AMS, which has established a connection to the second T-ABS, may transmit and receive data reliably to and from the second T-ABS using the STID in step S314.

Figure 4:
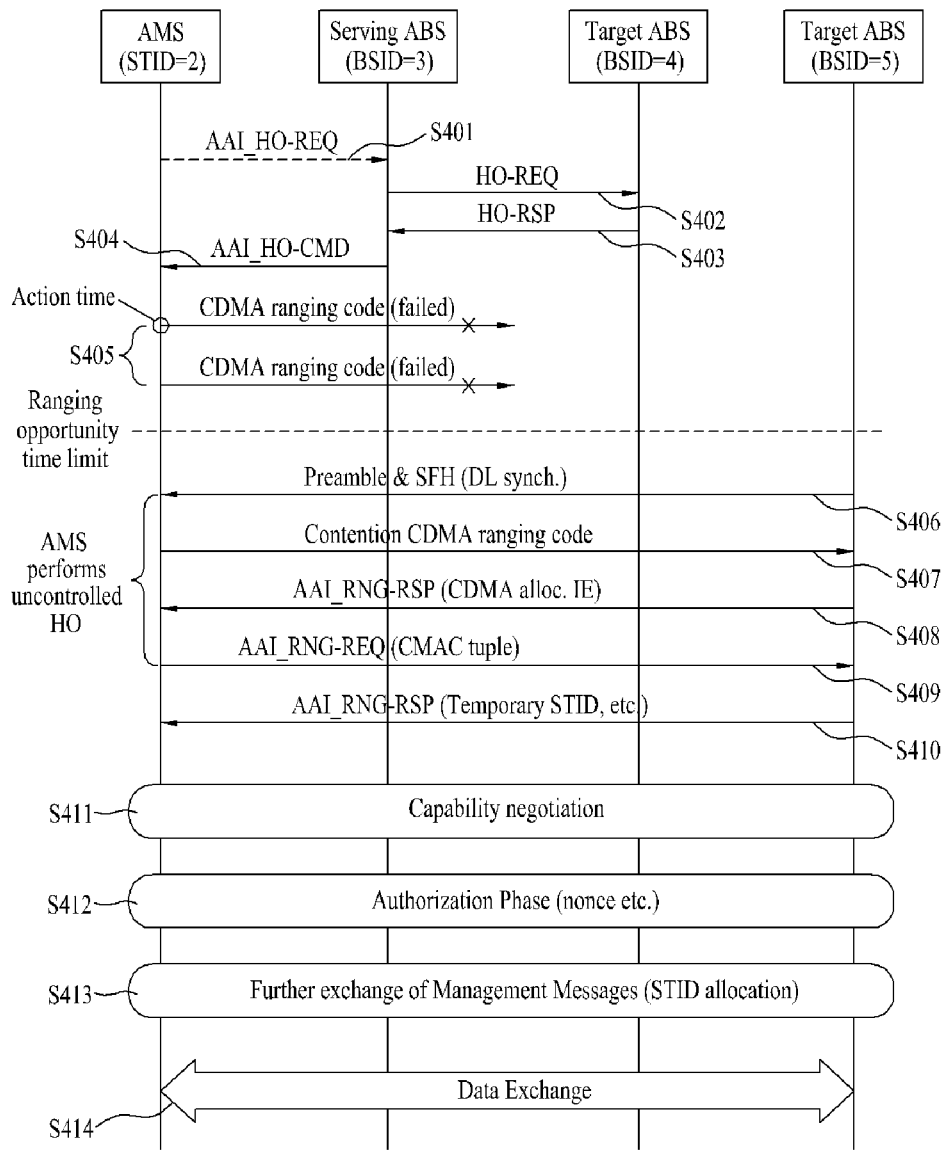
FIG. 4 is a diagram illustrating a signal flow for a method for performing a handover to a neighbor BS, when an MS fails in a handover to a target BS.

FIG. 4 is a diagram illustrating a signal flow for a method for performing an uncontrolled HO of Type 2 to a neighbor ABS, when the AMS fails in an HO to a T-ABS.

In the illustrated case of FIG. 4, the AMS fails in an HO to a T-ABS recommended by the S-ABS due to an unintended error and performs an HO to another T-ABS in an uncontrolled fashion, without notifying the S-ABS of this situation. Steps S401 to S404 are identical to steps S301 to S304 of FIG. 3. Therefore, FIG. 3 is referred to for steps S401 to S404.

Referring to FIG. 4, the AMS may transmit a CDMA ranging code to the first T-ABS with BSID=4 at an action time to perform an HO to the first T-ABS. However, the AMS may fail in transmitting the CDMA ranging code within a ranging opportunity time limit due to its channel status in step S405.

Thus, the AMS may perform an uncontrolled HO to the second T-ABS. Steps S406 to S414 are identical to steps S306 to S314. Hence, FIG. 3 may be referred to for steps S406 to S414.

The uncontrolled HO has been described with reference to FIGS. 3 and 4. The HO procedure illustrated in FIGS. 1 and 2 is for a controlled or coordinated HO being the counterpart of the uncontrolled HO.

Figure 5:
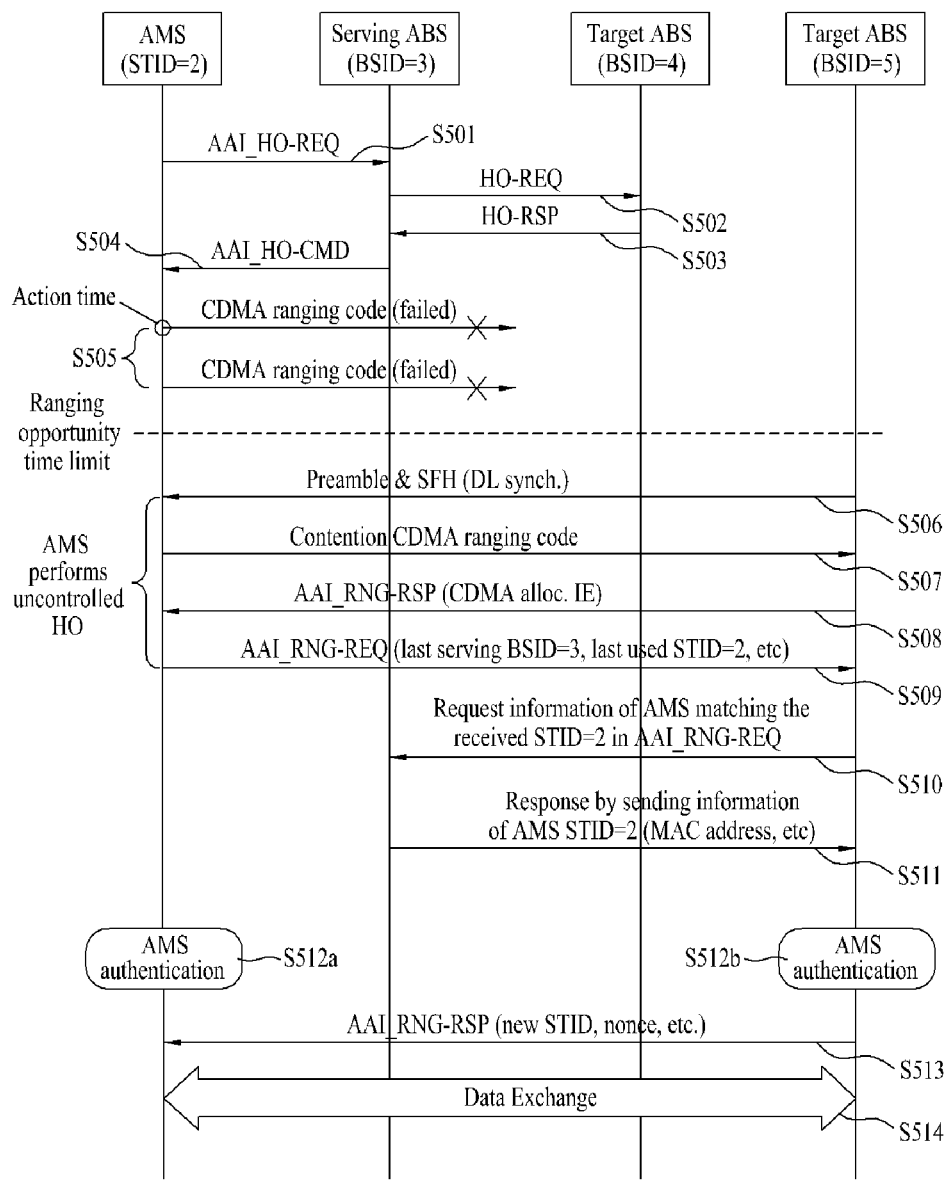
FIG. 5 is a diagram illustrating a signal flow for a method for performing a handover to a neighbor BS, when an MS fails in a handover to a target BS according to an exemplary embodiment of the present invention.

FIG. 5 is a diagram illustrating a signal flow for a method for performing a handover to a neighbor BS, when an MS fails in a handover to a target BS according to an exemplary embodiment of the present invention.

FIG. 5 discloses a method for being allocated a STID uniquely identifying the AMS in a target base station when the AMS performs network re-entry to the T-ABS in an uncontrolled HO situation. In the illustrated case of FIG. 5, an uncontrolled HO of Type 2 as described with reference to FIG. 4 is performed.

Referring to FIG. 5, in spite of an HO of the AMS, the S-ABS may keep information about the AMS as long as the value of a resource retain timer, without immediately deleting the AMS information. Therefore, in case where the AMS returns to the S-ABS or another T-ABS requests the AMS information to the S-ABS during an uncontrolled HO, the S-ABS may provide a service again immediately to the AMS or rapidly transmit the AMS information to the T-ABS.

That is, during the uncontrolled HO of the AMS to the T-ABS, if the T-ABS has knowledge of the S-ABS from which the AMS has moved, it may request the AMS information to the S-ABS, thereby guaranteeing location privacy to the AMS and efficiently performing a remaining HO procedure or a network re-entry procedure.

However, upon expiration of the resource retain timer of the S-ABS that has provided a service to the AMS, the AMS should perform a ranging procedure the same as or similar to an initial network entry to the T-ABS. (The AMS is aware of when the resource retain timer of the S-ABS expires.) That is, the AMS should include the AMS's MAC address instead of the valid Cipher-based Message Authentication Code (CMAC) tuple. The expired timer entry request/re-entry request may also include the S-ABS ID, so that the T-ABS has the option of querying the prior base station for information regarding the AMS.

Steps S501 to S507 of FIG. 5 are identical to steps S401 to S407 of FIG. 4. Thus, the description of FIGS. 3 and 4 may be referred to for steps S501 to S507.

Upon receipt of a contention-based CDMA ranging code from the AMS, the second T-ABS with BSID=5 may allocate a resource area to the AMS, so that the AMS performs network re-entry to the second T-ABS in the resource region. Information about the allocated resource region may be included in a CDMA allocation Information Element (IE). The second T-ABS may transmit an AAI_RNG-RSP message including the CDMA allocation IE to the AMS in step S508.

The AMS may transmit an AAI_RNG-REQ message in the allocated resource region indicated by the CDMA allocation IE to the second T-ABS in step S509. The AAI_RNG-REQ message may include the BSID (=3) of the old S-ABS and the STID (=2) of the AMS used in the old S-ABS.

Upon receipt of the AAI_RNG-REQ message from the AMS, the second T-ABS may be aware of the old S-ABS of the AMS from the BSID set in the AAI_RNG-REQ message. Accordingly, the second T-ABS may request AMS information corresponding to the STID of the AMS to the S-ABS in step S510.

Upon receipt of the AMS-related request from the second T-ABS within a time period set to the resource retain timer, the S-ABS may transmit the AMS information associated with the AMS to the second T-ABS in step S511. The AMS information may include at least one of the MAC address of the AMS, information about the basic capabilities of the AMS, security parameters (e.g. security performance, an authentication key (AK), etc.), and a nonce.

The second T-ABS may authenticate the AMS using the security parameters, the nonce, the AK, etc. that it shares in steps S512a and S512b.

The second T-ABS may reply to the AAI_RNG-REQ message with an AAI_RNG-RSP message including a new STID uniquely allocated to the AMS, an updated nonce, etc. to the AMS in step S513. The AAI_RNG-RSP message may further include a CMAC tuple valid in the second T-ABS.

If the authentication procedure of steps S512a and S512b is performed after the HO ranging procedure, the second T-ABS may transmit a temporary STID instead of the new STID to the AMS by the AAI_RNG-RSP message in order to protect the MAC address of the AMS.

In step S514, the AMS may exchange information with the second T-ABS normally using the allocated STID.

Figure 6:
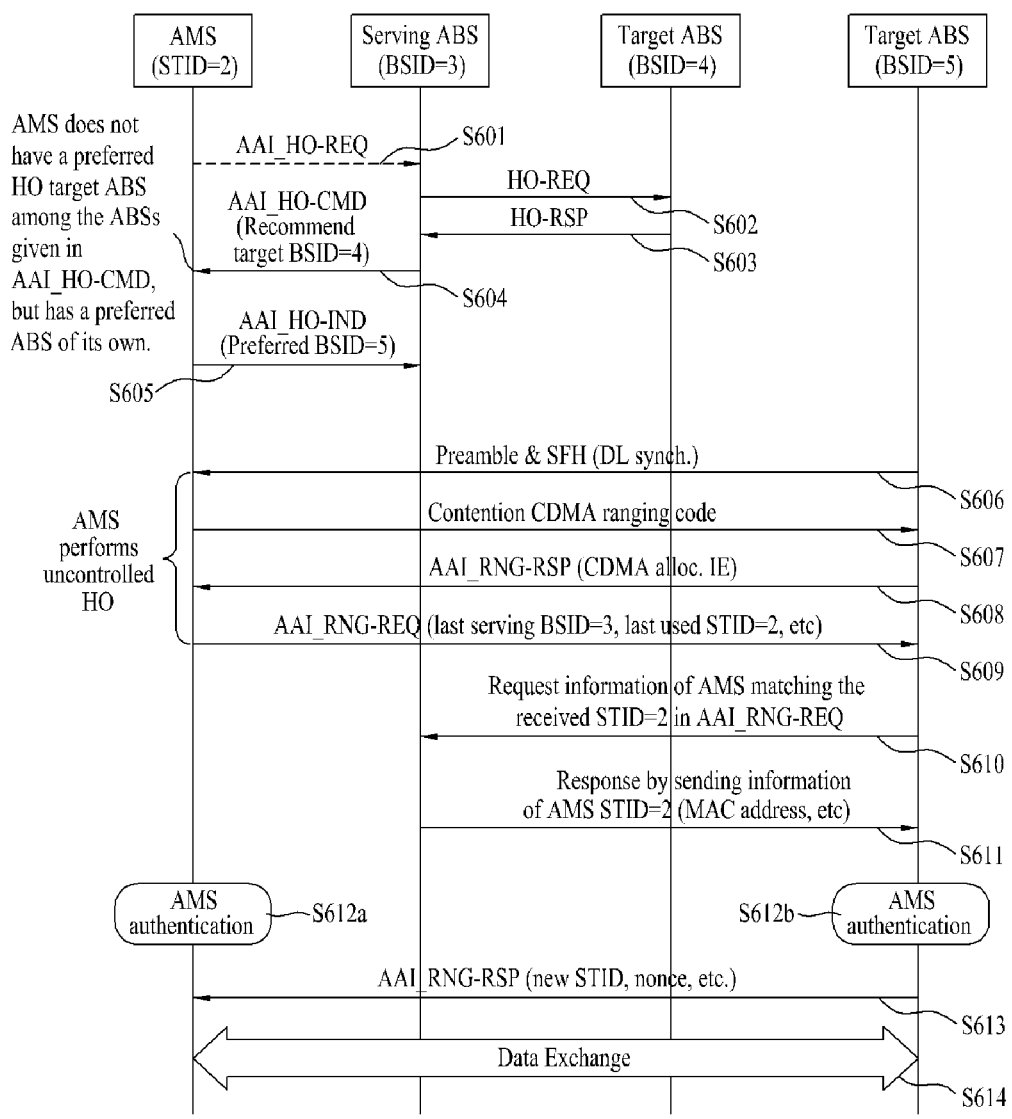
FIG. 6 is a diagram illustrating a signal flow for a method for performing a handover to a neighbor BS, when an MS fails in a handover to a target BS according to another exemplary embodiment of the present invention.

FIG. 6 is a diagram illustrating a signal flow for a method for performing an HO to a neighbor ABS, when an AMS fails in an HO to a T-ABS according to another exemplary embodiment of the present invention.

FIG. 6 illustrates a method for efficiently allocating an STID specific to an AMS by a target ABS, when the AMS performs network re-entry to the target ABS in an uncontrolled HO situation. In the illustrated case of FIG. 6, an uncontrolled HO of Type 1 as described with reference to FIG. 3 is performed.

It is assumed in FIG. 6 that an STID of 2 is allocated to the AMS, the BSID of the S-ABS is 3, and the first and second T-ABSs among candidate ABSs have a BSID of 4 and a BSID of 5, respectively.

Referring to FIG. 6, the AMS may transmit an AAI_HO-REQ message to the S-ABS to initiate an HO in step S601.

Step S601 may be performed only in case of an AMS-initiated HO, not in case of an ABS-initiated HO. In other words, step S601 is optional according to an HO situation.

The S-ABS with BSID=3 may transmit an AAI_HO-REQ message including AMS information about the AMS to one or more candidate ABSs. For notational simplicity, it is assumed that the S-ABS transmits an HO-REQ message to the first T-ABS with BSID=4 in step S602.

The first T-ABS may transmit an HO-RSP message including HO information such as a dedicated ranging code, a ranging opportunity, an action time parameter, a UAI/AI, etc. for use in network re-entry of the AMS to the S-ABS over the backbone network in step S603.

The S-ABS may transmit an AAI_HO-CMD message including HO information and information about recommended candidate ABSs (e.g. BSID=4) to the AMS in step S604.

When the AMS intends to perform an HO to a T-ABS other than the candidate ABSs recommended by the S-ABS, it may transmit an AAI_HO-IND message including information about the preferred T-ABS (e.g. BSID=5) to the S-ABS in step S605. An event code may be set to 2 (Code 2) in the AAI_HO-IND message.

Thus the S-ABS may be aware that the T-ABS to which the AMS intends to perform the HO is the second T-ABS. Accordingly, the S-ABS may provide the AMS information to the second T-ABS by resetting the resource retain timer, as requested by the user.

The AMS may move into the cell area of the second T-ABS with BSID=5 that it prefers and receive a preamble or an SFH broadcast periodically from the second T-ABS. That is, the AMS may acquire downlink synchronization to the second T-ABS using the preamble or the SFH in step S606.

In step S607, the AMS may transmit a contention-based CDMA ranging code to the second T-ABS in the earliest ranging opportunity after the downlink synchronization acquisition in order to perform the network re-entry to the second T-ABS.

Upon receipt of the contention-based CDMA ranging code, the second T-ABS may allocate a resource region to the AMS, so that the AMS performs network re-entry to the second T-ABS in the resource region. Information about the allocated resource region may be included in a CDMA allocation IE. The second T-ABS may transmit an AAI_RNG-RSP message including the CDMA allocation IE to the AMS in step S608.

The AMS may transmit an AAI_RNG-REQ message in the allocated resource area indicated by the CDMA allocation IE to the second T-ABS in step S609. The AAI_RNG-REQ message may include the BSID (=3) of the old S-ABS and the STID (=2) of the AMS last used in the old S-ABS.

Upon receipt of the AAI_RNG-REQ message from the AMS, the second T-ABS may be aware of the old S-ABS of the AMS from the BSID set in the AAI_RNG-REQ message. Accordingly, the second T-ABS may request AMS information corresponding to the STID of the AMS to the S-ABS in step S610.

Upon receipt of the AMS-related request from the second T-ABS within a time period set to the resource retain timer, the S-ABS may transmit the AMS information associated with the AMS to the second T-ABS in step S611. The AMS information may include at least one of the MAC address of the AMS, information about the basic capabilities of the AMS, security parameters (e.g. security performance, an AK, etc.), and a nonce.

The second T-ABS may authenticate the AMS using the security parameters, the nonce, the AK, etc. that it shares in steps S612a and S612b.

The second T-ABS may reply to the AAI_RNG-REQ message with an AAI_RNG-RSP message including a new STID specific to the AMS, an updated nonce, etc. to the AMS in step S613. The AAI_RNG-RSP message may further include a CMAC tuple valid in the second T-ABS.

If the authentication procedure of steps S612a and S612b is performed after the HO ranging procedure, the second T-ABS may transmit a temporary STID instead of the new STID to the AMS by the AAI_RNG-RSP message in order to protect the MAC address of the AMS.

In step S614, the AMS may exchange information with the second T-ABS normally using the allocated STID or the temporary STID.

Figure 7:
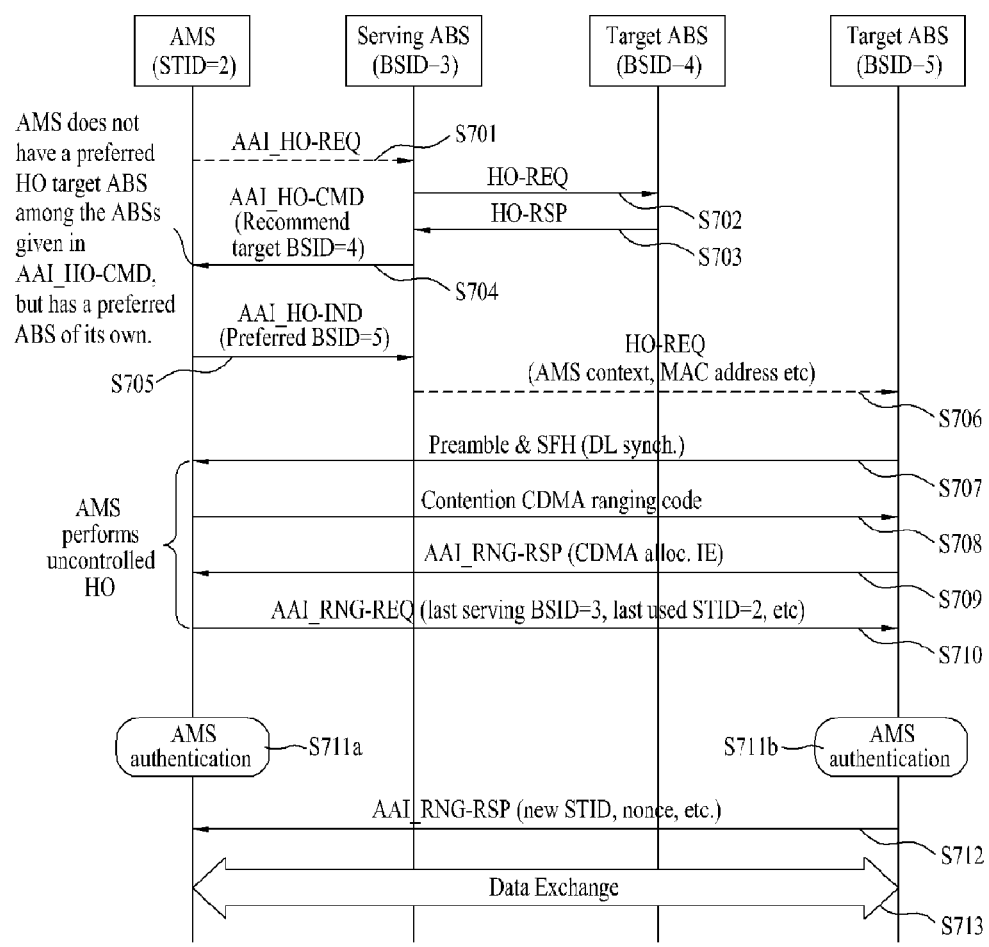
FIG. 7 is a diagram illustrating a signal flow for a method for performing a handover to a neighbor BS, when an MS fails in a handover to a target BS according to another exemplary embodiment of the present invention.

FIG. 7 is a diagram illustrating a signal flow for a method for performing an uncontrolled HO to a neighbor ABS, when an AMS fails in an HO to a T-ABS according to another exemplary embodiment of the present invention.

The uncontrolled HO illustrated in FIG. 7 is similar to that illustrated in FIG. 6. Therefore, a description of steps S701 to S705 can be replaced with that of steps S601 to S605 of FIG. 6.

Referring to FIG. 7, upon receipt of an AAI_HO-IND message from the AMS in step S705, the S-ABS may be aware that a T-ABS to which the AMS intends to perform the HO is the second T-ABS. Accordingly, the S-ABS may transmit an HO-REQ message including AMS information about the AMS and/or the ID of the S-ABS (BSID=3) to the second T-ABS that the AMS prefers over the backbone network in step S706. The AMS information may include an AMS context, an STID, information about basic capabilities of the AMS, security information, and the MAC address of the AMS.

Upon receipt of the HO-REQ message from the S-ABS, the second T-ABS may store the AMS information for a predetermined time period.

The AMS may move into the cell area of the second T-ABS with BSID=5 that it prefers and receive a preamble or an SFH broadcast periodically from the second T-ABS. That is, the AMS may acquire downlink synchronization to the second T-ABS using the preamble or the SFH in step S707.

In step S708, the AMS may transmit a contention-based CDMA ranging code to the second T-ABS in the earliest ranging opportunity after the downlink synchronization acquisition in order to perform the network re-entry to the second T-ABS.

Upon receipt of the contention-based CDMA ranging code, the second T-ABS may allocate a resource area to the AMS, so that the AMS performs network re-entry to the second T-ABS in the resource region. Information about the allocated resource region may be included in a CDMA allocation IE. The second T-ABS may transmit an AAI_RNG-RSP message including the CDMA allocation IE to the AMS in step S709.

The AMS may transmit an AAI_RNG-REQ message in the allocated resource region indicated by the CDMA allocation IE to the second T-ABS in step S710. The AAI_RNG-REQ message may include the BSID (=3) of the old S-ABS and the STID (=2) of the AMS used in the old S-ABS lastly.

Upon receipt of the AAI_RNG-REQ message from the AMS, the second T-ABS may acquire AMS information (e.g. the MAC address) by comparing the AMS information and/or the BSID received and stored in step S706 with the BSID of 3 and the STID of 2 set in the AAI_RNG-REQ message.

Accordingly, the second T-ABS and the AMS may perform authentications without an additional procedure in steps S711a and S711b.

The second T-ABS may reply to the AAI_RNG-REQ message with an AAI_RNG-RSP message including a new STID specific to the AMS, an updated nonce, etc. to the AMS in step S712. The AAI_RNG-RSP message may further include a CMAC tuple valid in the second T-ABS.

If the authentication procedure of steps S711a and S711b is performed after the HO ranging procedure, the second T-ABS may transmit a temporary STID instead of the new STID to the AMS by the AAI_RNG-RSP message in order to protect the MAC address of the AMS.

In step S713, the AMS may exchange information with the second T-ABS normally using the allocated STID.

Figure 8:
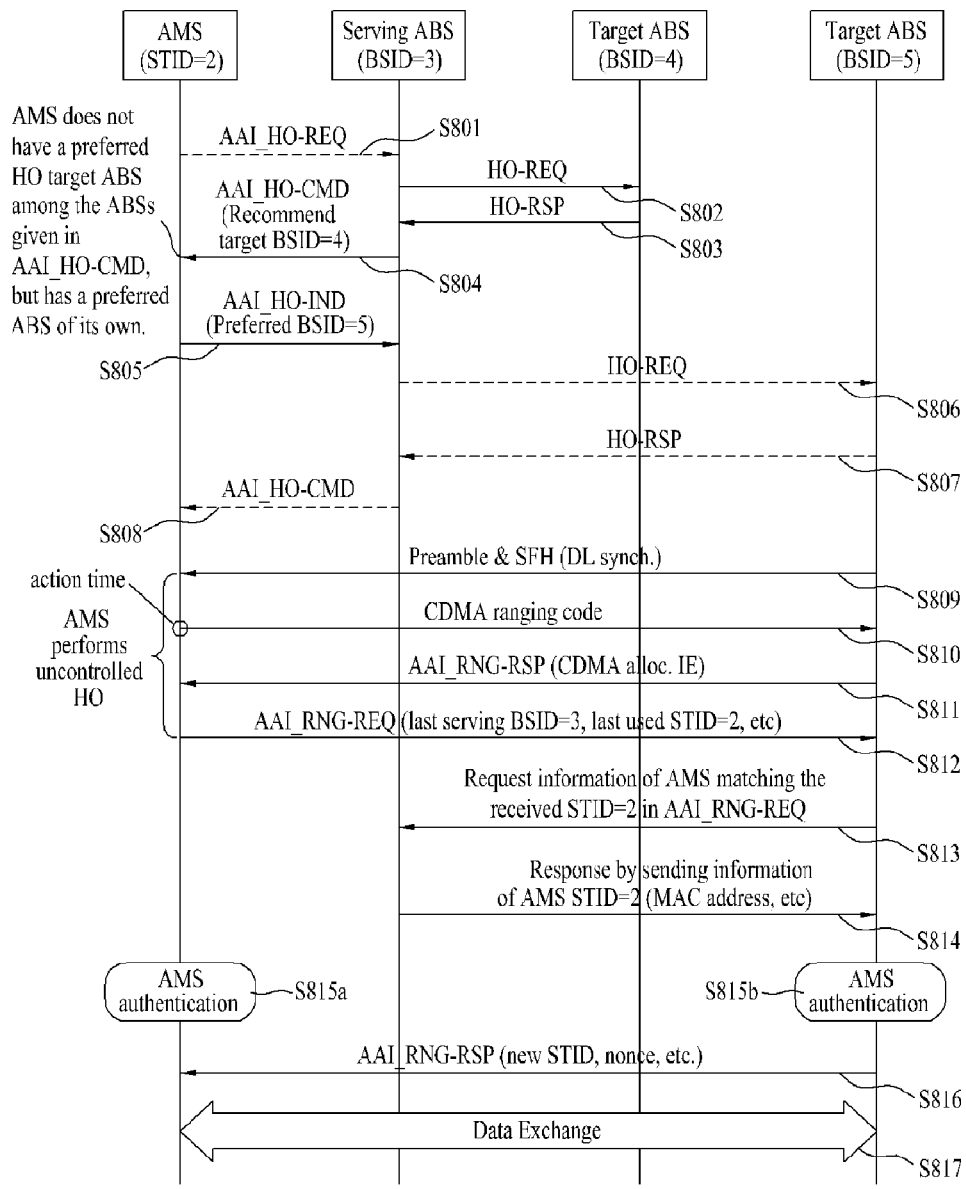
FIG. 8 is a diagram illustrating a signal flow for a method for performing a handover to a neighbor BS, when an MS fails in a handover to a target BS according to an exemplary embodiment of the present invention.

FIG. 8 is a diagram illustrating a signal flow for a method for performing an HO to a neighbor ABS, when an AMS fails in an HO to a T-ABS according to another exemplary embodiment of the present invention.

FIG. 8 is basically based on the same assumption of FIG. 6. Therefore, a description of steps S801 to S805 of FIG. 8 can be replaced with the description of steps S601 to S605 of FIG. 6.

Referring to FIG. 8, the S-ABS with BSID=3 may transmit an HO-REQ message including AMS information about the AMS to the second T-ABS with BSID=5 in step S806.

The second T-ABS may transmit an HO-RSP message including HO information such as a dedicated ranging code, a ranging opportunity, an action time parameter, a UAI/AI, etc. for use in network re-entry of the AMS to the S-ABS over the backbone network in step S807.

The S-ABS may transmit an AAI_HO-CMD message including the received HO information to the AMS in step S808.

The AMS may move into the cell area of the second T-ABS with BSID=5 that it prefers and receive a preamble or an SFH broadcast periodically from the second T-ABS. That is, the AMS may acquire downlink synchronization to the second T-ABS using the preamble or the SFH in step S809.

In step S810, the AMS may transmit a CDMA ranging code to the second T-ABS using the dedicated ranging code and ranging opportunity included in the HO information received in step S808.

The following ranging procedure between the AMS and the second T-ABS in steps S811 to S817 is identical to steps S608 to S614 of FIG. 6. Therefore, FIG. 6 is referred to for steps S811 to S817.

Figure 9:
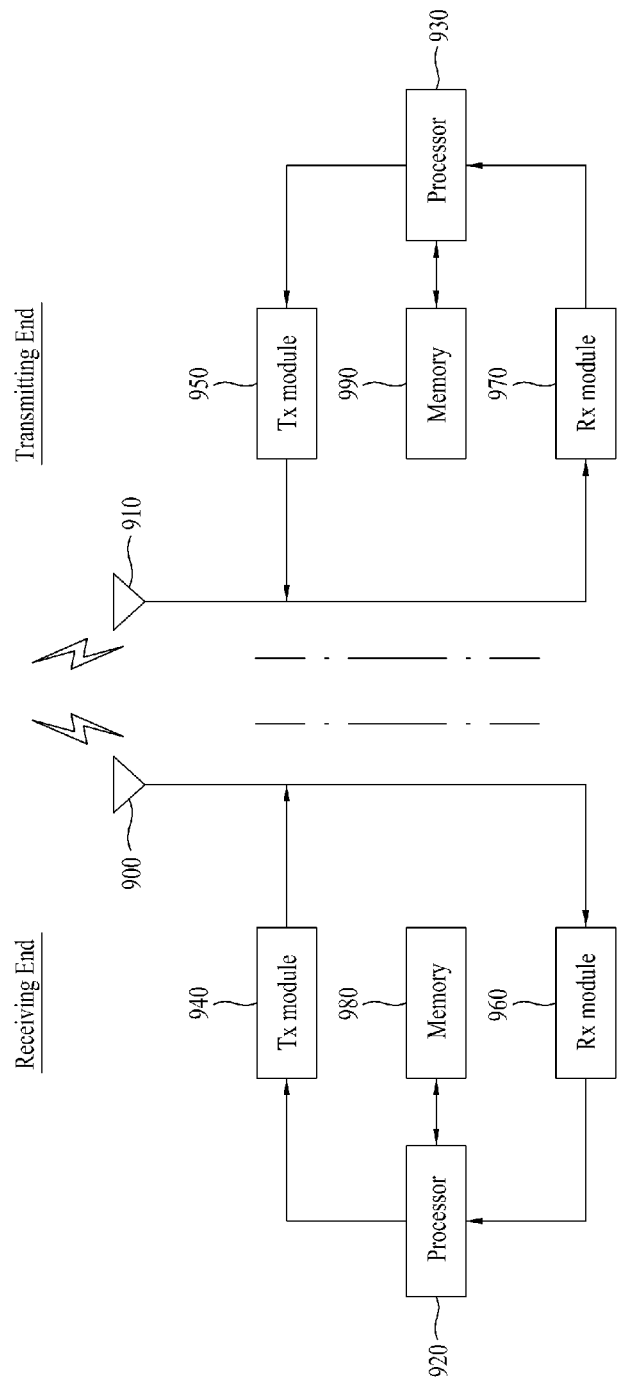
FIG. 9 is a block diagram of an MS and a BS for performing the exemplary embodiments of the present invention illustrated in FIGS. 2 to 8, according to a further exemplary embodiment of the present invention.

FIG. 9 is a block diagram of an AMS and an ABS for performing the exemplary embodiments of the present invention illustrated in FIGS. 2 to 8, according to a further exemplary embodiment of the present invention.

The AMS may operate as a transmitter on an uplink and as a receiver on a downlink. The ABS may operate as a receiver on the uplink and as a transmitter on the downlink.

The AMS and the ABS may include Transmission (Tx) modules 940 and 950, respectively and Reception (Rx) modules 960 and 970, respectively, to control transmission and reception of information, data, and/or messages. Also, the AMS and the ABS may include antennas 900 and 910, respectively to transmit and receive the information, data, and/or messages. The AMS and the ABS may further include processors 920 and 930, respectively for implementing the afore-described exemplary embodiments of the present invention and memories 980 and 990, respectively for temporarily or permanently storing information generated during the operations of the processors 920 and 930.

Especially each of the processors 920 and 930 may include an HO module for performing the HO procedures according to the exemplary embodiments of the present invention, an encryption module (or means) for encrypting a predetermined number of timer messages, and/or a decoding module (or means) for interpreting encrypted messages. Also, the AMS and the ABS illustrated in FIG. 9 each may further include a low-power Radio frequency/Intermediate Frequency (RF/IF) module.

The Tx and Rx modules 940 to 970 of the AMS and the ABS may carry out packet modulation and demodulation, high-speed packet channel coding, Orthogonal Frequency Division Multiple Access (OFDMA) packet scheduling, and/or channel multiplexing, for data transmission.

The processors 920 and 930 of the AMS and the ABS may perform a control function for an uncontrolled HO according to the present invention, an HO function, an authentication and encryption function, a variable MAC frame control function, a real-time high-speed traffic control function, and/or a real-time MODEM control function.

The apparatuses illustrated in FIG. 9 may implement the methods described with reference to FIGS. 1 to 8. The exemplary embodiments of the present invention may be implemented using the components and functions of the AMS and ABS apparatuses.

The processor 920 of the AMS may monitor the HO conditions described before with reference to FIGS. 1 and 2. If an HO initiation condition is met, the processor 920 includes AMS information about the AMS in an AAI_HO-REQ message and controls the Tx module 940 to transmit the AAI_HO-REQ message to an S-ABS through the antenna 900.

The Rx module 960 of the AMS may receive an AAI_HO-CMD message from the S-ABS and provide it to the processor 920. The processor 920 may store HO information included in the AAI_HO-CMD message in the memory 980 and perform an HO operation based on the HO information.

The processor 920 of the AMS may determine whether to perform the afore-described controlled or uncontrolled HO. It is assumed in the exemplary embodiment of the present invention that the uncontrolled HO is performed. Therefore, the AMS may transmit an AAI_HO-IND message to the ABS using the processor 920, the Tx module 940, and the antenna 900.

The AMS may perform network re-entry described in FIGS. 3 to 8 to a T-ABS using the HO module of the processor 920 and transmit and receive associated messages through the Tx module 940, the Rx module 960, and the antenna 900. The processor 920 is responsible for controlling the HO procedure.

The Rx module 970 of the S-ABS may provide an HO-REQ message and/or an HO-IND message received through the antenna 950 to the processor 990. The processor 990 may store AMS information in the memory 990 and transmit an AAI_HO-CMD message including HO information to the AMS through the Tx module 950.

The T-ABS may perform the network re-entry procedure described with reference to FIGS. 3 to 8 with the AMS using its antenna, Tx module and Rx module. That is, the T-ABS may manage an HO procedure using the HO module of the processor and transmit and receive messages required for implementing the HO procedure to and from the AMS.

Meanwhile, the MS or AMS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.)

The exemplary embodiments of the present invention may be achieved by various means, for example, hardware, firmware, software, or a combination thereof.

In a hardware configuration, a method for transmitting an uplink signal according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. For example, software code may be stored in the memories 980 and 990 and executed by the processors 920 and 930. The memories are located at the interior or exterior of the processors and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention are applicable to various wireless access systems. For example, the wireless access systems are a 3GPP system, a 3GPP2 system, and/or an IEEE 802.xx system. Besides the wireless access systems, the exemplary embodiments of the present invention are applicable to all technical fields in which the wireless access systems find their applications.

What is claimed is:

1. A method for performing an uncontrolled handover in a mobile station (MS), the method comprising:
   receiving, from a serving base station (SBS), a handover command message comprising one or more base station identifiers (BSIDs) of target base stations (TBSs) recommended by the SBS;
   transmitting, to the SBS, a handover indication message comprising an event code indicating all TBSs recommended by the SBS are unreachable and a BSID of a preferred TBS, when all TBSs recommended by the SBS are unreachable and the MS has the preferred TBS;
   performing a contention based CDMA ranging procedure with the preferred TBS;
   transmitting, to the preferred TBS, a ranging request message comprising a base station identifier of the SBS and a station identifier (STID) which the MS uses in the SBS; and
   receiving, from the preferred TBS, a ranging response message comprising a STID for the MS to use in the preferred TBS.

2. The method according to claim 1, wherein the ranging response message is transmitted in response to the ranging request message.

3. The method according to claim 1, wherein the ranging request message and the ranging response message are used for the uncontrolled handover.

4. The method according to claim 1, wherein the uncontrolled handover is performed unless the MS determines a resource retain timer of the SBS has expired.

5. A mobile station (MS) for performing an uncontrolled handover in a wireless access system, the MS comprising:
   a transmission module;
   a reception module; and
   a processor for supporting the uncontrolled handover,
   wherein the MS is configured to:
   receive, from a serving base station (SBS) via the reception module, a handover command message comprising one or more base station identifiers (BSIDs) of target base stations (TBSs) recommended by the SBS;
   transmit, to the SBS via the transmission module, a handover indication message comprising an event code indicating all TBSs recommended by the SBS are unreachable and a BSID of a preferred TBS, when all TBSs recommended by the SBS are unreachable and the MS has the preferred TBS;
   perform a contention based CDMA ranging procedure with the preferred TBS;
   transmit, to the preferred TBS via the transmission module, a ranging request message comprising a base station identifier of the SBS and a station identifier (STID) which the MS uses in the SBS; and
   receive, from the preferred TBS via the reception module, a ranging response message comprising a STID for the MS to use in the preferred TBS.

6. The mobile station according to claim 5, wherein the ranging response message is transmitted in response to the ranging request message.

7. The mobile station according to claim 5, wherein the ranging request message and the ranging response message are used for the uncontrolled handover.

8. The mobile station according to claim 5, wherein the uncontrolled handover is performed unless the MS determines a resource retain timer of the SBS has expired.

9. A method for supporting an uncontrolled handover of a mobile station (MS), the method comprising:
   transmitting, by a serving base station (SBS) to the MS, a handover command message comprising one or more base station identifiers (BSIDs) of target base stations (TBSs) recommended by the SBS;
   receiving, by the SBS from the MS, a handover indication message comprising an event code indicating all TBSs recommended by the SBS are unreachable and a BSID of a preferred TBS, when all TBSs recommended by the SBS are unreachable and the MS has the preferred TBS;
   performing, by the MS with the preferred TBS, a contention based CDMA ranging procedure;
   receiving, by the preferred TBS from the MS, a ranging request message comprising a base station identifier of the SBS and a station identifier (STID) which the MS uses in the SBS; and
   transmitting, by the preferred TBS to the MS, a ranging response message comprising a STID for the MS to use in the preferred TBS.

10. The method according to claim 9, wherein the ranging response message is transmitted in response to the ranging request message.

11. The method according to claim 9, wherein the ranging request message and the ranging response message are used for the uncontrolled handover.

12. The method according to claim 9, wherein the uncontrolled handover is performed unless the MS determines a resource retain timer of the SBS has expired.

* * * * *